3,817,733
APPARATUS AND PROCESS FOR SUBDIVIDING SEALED GLASS TUBE CONTAINING RADIOACTIVE GAS

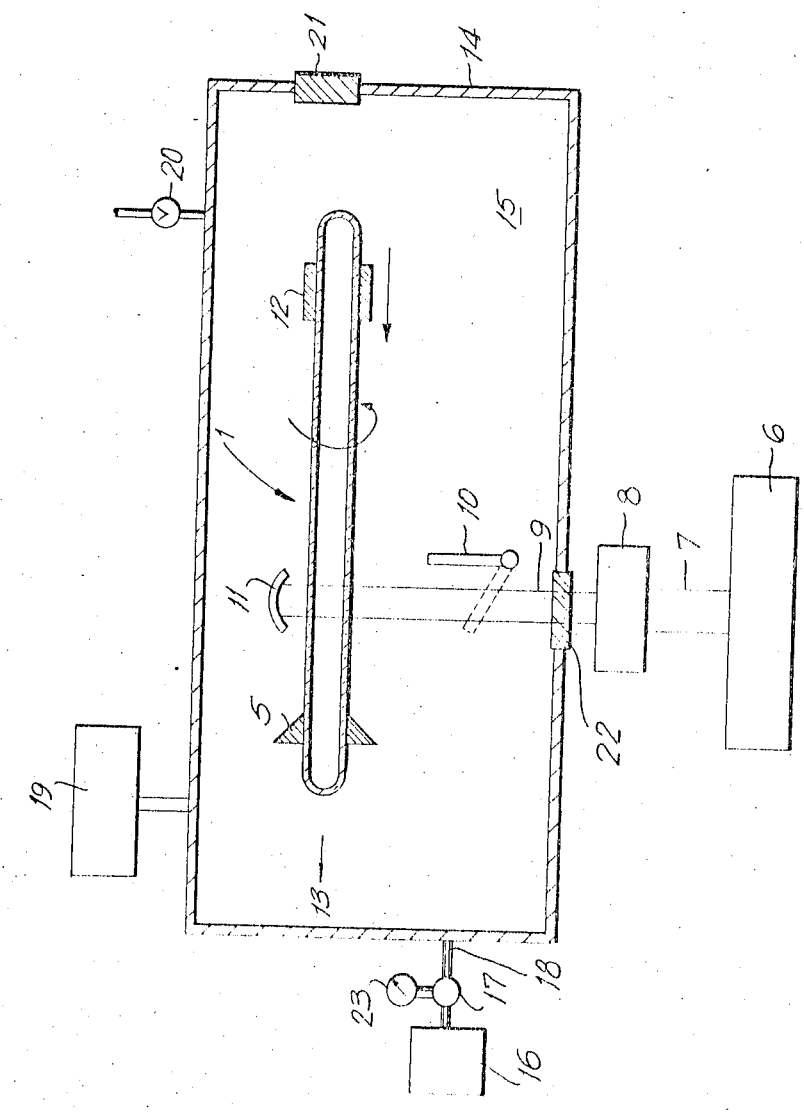

Oscar Thuler, 91 Bumplitz Strasse, Bern, Switzerland
Continuation-in-part of application Ser. No. 832,273, June 11, 1969, now Patent No. 3,706,543, dated Dec. 19, 1972. This application May 16, 1972, Ser. No. 253,766
Claims priority, application Switzerland, Aug. 22, 1968, 12,639/68
Int. Cl. C03b 21/06
U.S. Cl. 65—56
3 Claims

ABSTRACT OF THE DISCLOSURE

A sealed glass tube containing a luminophor and a radioactive gas is subdivided by heating the tube to fusion by means of a laser beam. The tube is heated within a sealed enclosure and means are provided for regulating the pressure within the enclosure so that the pressure exceeds that within the glass tube.

CROSS REFERENCE TO RELATED APPLICATION

This application is a continuation-in-part of my copending application Ser. No. 832,273 filed June 11, 1969, now Pat. No. 3,706,543, granted Dec. 10, 1972.

BACKGROUND OF THE INVENTION

A process for the subdivision of a long, sealed glass tube containing a luminophor and a radioactive gas where the subdivision is carried out by heating a zone of the glass tube to fusion and wherein the pressure within the glass tube is sub-atmospheric has been disclosed in my copending Pat. No. 3,706,543. The use of the laser beam represented a substantial improvement over the prior art in that the tube was heated to the temperature of fusion so rapidly that heat transfer along the tube was minimized, thereby minimizing damage to the luminophor in adjacent portions of the tube.

The method of subdivision described in the aforenoted application shared the limitation common to all processes of production radioactive light sources: to a make a gas-tight seal, the internal gas pressure must be below atmospheric pressure. Otherwise, when the glass becomes soft under the influence of the flame or the laser beam, the softened glass forms a balloon which may burst and release radioactive gas instead of collapsing so that when the divided-off tube is pulled away from the long tubular source, a gas-tight seal is formed on both sides. Moreover, the gas pressure within the tube must not be so far below atmospheric that the collapsed glass is sucked inwardly to form a fragile seal. As is evident, the internal and external pressures must be so related that a proper gas-tight seal is formed on both of the ends produced in the process. However, the lower the gas pressure within the final light source, the lower the brightness of the source produced. The higher gas pressure always yields a higher brightness.

A number of different methods have been attempted as a means of by-passing the limitation that the gas pressure within the source must be below atmospheric. For instance, the source to be sealed off is cooled as by immersion in liquid nitrogen. Such cooling drops the internal pressure by an amount which is approximately proportional to the drop in absolute temperature. The conditions to make a gas-tight seal are then met, the pressure and therefore the brightness will be correspondingly higher as compared with a source which is sealed off without immersion in a cooling medium. By using liquid nitrogen as the cooling medium, where the liquid nitrogen has a temperature of about 90° K., a source having a pressure about 3.3 times greater than would otherwise be the case can thus be made, assuming that room temperature is 300° K.

This process by means of which it is possible to provide sources with higher internal pressure and brightness has been used with some success. However, it is tedious, but more important, the portion which is cooled and which is to be subdivided off from the main portion will contain a quantity of gas such that when sealed off and returned to room temperature, the pressure within the sealed off portion will be about 3 times as high as the pressure in the original long tube. However, as successive portions of the long tube are sealed off and removed, the pressure of the remaining gas in the long tube will become depleted so that the final sources manufactured in this way may have pressures which are even lower than atmospheric. Consequently, the process suffers from the major disadvantage that light sources manufactured in this way will vary very substantially in the brightness thereof. This technique, therefore, is used only when the source to be cut off can be maintained in contact with a large reservoir of radioactive gas which can either be replenished or where the depletion effect is negligible.

SUMMARY OF THE INVENTION

Radioactive light sources containing a luminophor and a radioactive gas at super-atmospheric pressure where the light sources are essentially equal in brightness can be manufactured by subdividing a long tube containing a luminophor and a radioactive gas while the tube is encased in a sealed chamber, the pressure of which can be regulated so that it is higher than that within the sealed tube by a suitable amount. The pressure within the sealed chamber is so regulated that on heating the sealed tube with a laser beam, the sealed tube collapses quickly so that a portion of the sealed tube may be withdrawn from the remainder, both the withdrawn portion and the sealed tube having new ends formed thereon, the ends being strong and hermetic.

The use of a sealed chamber for the operation constitutes a protection against the possibility of exposure to radioactive gas following accidental breakage of the radioactive gas-containing tube.

Accordingly, an object of the present invention is to provide improved radioactive light-sources having increased luminosity.

Another object of the present invention is to provide improved radioactive light-sources having strong, hermetic end seals.

A further object of the present invention is to provide an improved process for producing radioactive light-sources wherein the process of subdividing a long tube containing a luminophor and a radioactive gas is carried out within a sealed chamber.

Still another object of the present invention is to provide an improved process for producing radioactive light-sources wherein the process is carried out within a sealed chamber, and the difference in pressure between that in the radioactive light-source and that in the sealed chamber can be controlled.

Still another object of the present invention is to provide an improved process for manufacturing radioactive light-sources wherein the process is carried out within a sealed chamber and a laser beam is used for the heating of the sealed tube.

Still other object and advantages of the invention will in part be obvious and will in part be apparent from the specification.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

BRIEF DESCRIPTION OF THE DRAWING

For a fuller understanding of the invention, reference is had to the following description taken in connection with the accompanying drawing, in which:

The single Figure shows diagrammatically the apparatus of the present invention.

DESCRIPTION OF THE PREFERRED EMBODIMENT

A long tubular light source 1 is produced by sealing it off when immersed in a cooling medium such as liquid nitrogen and when in contact with a large reservoir of radioactive gas. This step, of course, is conventional. To carry out the steps of subdividing this long tube in accordance with the present invention, the tube 1 is placed in a gas-tight enclosure 14, this enclosure containing a suitable gas such as nitrogen at a pressure higher than that of the radioactive gas in the interior of long tubular light source 1.

As shown diagrammatically, laser 6 produces output beam 7 in a direction which is preferably perpendicular to the glass tube 1. A focusing device 8 for controlling the output beam 7 where the focusing device is a Kerr cell or crossed prism sets up a parallel beam 9 which is directed toward the glass tube 1 at the point to be fused. Preferably, the laser beam 9 at that stage has about the same cross section in the glass tube, thus providing that enough glass will be fused to form strong, hermetic seals as tube 1 is subdivided.

A metal plate 10 is fitted beside laser beam 9. The metal plate 10 can be swung in and out of position to stop the beam 9 from reaching tube 1 when so desired.

A metal reflector 11 may be provided on the further side of tube 1 to reflect any laser beam portion which passes tube 1 thereby preventing loss of energy and increasing the rate at which the heated zone of tube 1 is brought to the fusion temperature.

Laser beam 7 preferably has a wave length range lying within the optimum absorption range of the glass of which tube 1 is made. Laser 6 can, for instance, be of the $CO_2$ type which can produce a beam with a wave length of 10.6 microns at an output wattage of about 100 watts.

Chucks 2 and 5 are provided for holding the main portion of tube 1 and the portion which is to be cut off respectively. Both chucks 2 and 5 can be rotated in unison by means not shown and chuck 5 can be used to separate off the portion of light source 1 by moving the portion in the direction 13 after fusion and sealing are complete.

Laser beam 9 enters sealed chamber 14 through a suitable window 22 which is transparent to the laser light. Window 22 is preferably of potassium chloride.

Space 15 in sealed chamber 14 can be brought to any absolute pressure from zero to as high as desired by means of pump or gas supply 16, and regulator 17 which is provided with a compound gauge 23. The upper pressure limit must, of course, be somewhat higher than that in any glass tube which is to be sealed. Connection between regular 17 and space 15 is made by means of tube 18.

Control unit 19 is indicated diagrammatically; this control unit supplies electrical signals into the interior of enclosure 14 controlling devices (not shown) which carry out the mechanical movements necessary for sealing off short portions from the main portion of long tubular source 1.

The procedure is the following:

A long tubular source 1 containing radioactive gas at any pressure above zero and up to the maximum which the glass tube can withstand is introduced into the apparatus in the interior of pressure chamber 14 through gas-tight door 21. In general the maximum gas pressure is about 9 atmospheres absolute. The apparatus holds the long tubular light source by means of the chucks 2 and 5 which rotate source 1 in unison. Door 21 is then closed and the pressure within the chamber 14 is brought to the desired level. This pressure is so chosen that when a short section is sealed off from the long tube 1 by means of laser beam 9, the pressure difference between the inside of the source and the interior of enclosure 14 will cause tube 1 to collapse at the zone heated by laser beam 9, forming a hermetic seal. Drawing sealed-off portion to the left by means of chuck 5 results in the formation of properly shaped convex end seals. As successive sections are removed from source 1 the pressure on the inside thereof will change somewhat. The operator of the apparatus can observe the way in which the tube 1 collapses as it is heated and can adjust the pressure within the enclosure 14 by means of regulator 17 to ensure that each seal produced is properly convex and hermetic.

When a source has been completely subdivided into smaller sources, atmospheric pressure is established by opening valve 20 which leads to an exhaust system (not shown). Door 21 is then opened, a new tubular source to be subdivided is introduced through it into the apparatus and the procedure is repeated. The light sources which are sectioned from the tube 1 are removed through a door (not shown) at the bottom of sealed chamber 14.

Where it is desired to operate at sub-atmospheric pressure, a vacuum pump (not shown) can be attached to valve 20, thus providing for operation of sealed chamber 14 at any pressure desired from above zero absolute to any pressure which the sealed tube 1 can maintain.

As is obvious, chucks 2 and 5 could be operated from outside sealed chamber 14 by the use of magnetic forces. Also, the operation of pressure regulator 17 to alter the pressure within enclosure 14 could be made controllable by a device which senses the form of the end seals being produced at the separated ends of tube 1.

It will thus be seen that the objects set forth above, among those made apparent from the preceding description, are efficiently attained and, since certain changes may be made in carrying out the above process and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. An improved apparatus for dividing a long, sealed glass tube containing a luminophor and a radioactive gas into a shorter sealed tube suitable for use as a light source and a sealed remainder without loss of radioacitve gas wherein a closely localized laser beam is used to heat said long, sealed, glass tube to fusion at the zone whereat said long sealed glass tube is to be divided, so that a sufficient quantity of glass is drawn in from the side wall to form end walls, wherein the improvement comprises a sealable chamber in which said heating of said long, glass, sealed tube at said zone can be carried out and in which the pressure can be adjusted to exceed that within said sealed tube by a controlled difference, first and second chucks for holding said glass tube on either side of said zone, said first chuck holding that portion of glass to be divided off, said chucks being rotatable in unison at least during the period of heating said zone to fusion, and so mounted in said chamber that after heating said zone to fusion said first chuck is movable away from said zone and operable to release said shorter sealed tube and then returnable to its original position to receive, hold and rotate a subsequent portion of said remainder to be divided off, said second chuck being movable toward said heating zone, after dividing off a portion thereof, to feed a subsequent portion of said sealed glass tube into said first chuck to be grasped and rotated thereby, said difference in pressure being such as to ensure that the zone which is heated collapses to form strong, hermetic seals at the ends of said divided-off shorter tube and of said remainder, means for decreasing the pressure in said chamber to a selected level below atmospheric pressure and means for raising the pressure in said chamber above atmospheric pressure, both of said means being operatively connected to said chamber.

2. An improved process for dividing a long, sealed glass tube containing a luminophor and a radioactive gas into a shorter sealed tube and a remainder without loss of radioactive gas wherein said long, sealed, glass tube is heated to fusion by a closely localized laser beam over an area such that a sufficient quantity of glass may be drawn in from the side wall to form end walls and simultaneously seal the ends of the shorter tube and the remainder, the improvement comprising the steps of introducing said long tube into a sealable pressurizable chamber fitted with a window through which said laser beam may be introduced to heat said tube at a closely localized zone and with first and second chucks therein, said chucks being mounted for rotation in unison about a common axis and for movement in both axial directions, said chucks being positioned on either side of said heating zone, introducing said sealed tube to be divided into shorter segments into both of said chucks, sealing said chamber, adjusting the pressure in said chamber either upwardly or downwardly as needed to establish a selected pressure difference above that in said glass tube, rotating said tube, heating said tube to fusion by said laser beam to form a short sealed tube and a sealed remainder, drawing said first chuck with said short tube therein in an axial direction away from said second chuck, opening said first chuck to release said shorter tube, returning said first chuck to its original position, advancing said second chuck toward said first chuck toward said first to introduce a segment of said tube to be divided off into said first chuck and closing said first chuck, thus preparing the system for repetition of said process, said pressure difference being such that said zone when heated to fusion, collapses to form strong, hermetic seals at the ends of said divided-off shorter tube and of said remainder.

3. The process as defined in claim 2 wherein the pressure in said sealed chamber is adjusted periodically during the division of a long tube to compensate for changes in pressure within said tube as each segment is divided off.

References Cited
UNITED STATES PATENTS

| | | | |
|---|---|---|---|
| 3,265,855 | 8/1966 | Norton | 65—112 X |
| 3,434,818 | 3/1969 | Chauvin | 65—270 X |
| 3,453,097 | 7/1969 | Häfner | 65—112 X |
| 3,505,050 | 4/1970 | Huston | 65—270 X |
| 3,706,543 | 12/1972 | Thuler | 65—112 X |
| 3,318,512 | 5/1967 | Linlor | 65—112 X |

ROBERT L. LINDSAY, Jr., Primary Examiner

U.S. Cl. X.R.

65—105, 153, 278